Figure 1:
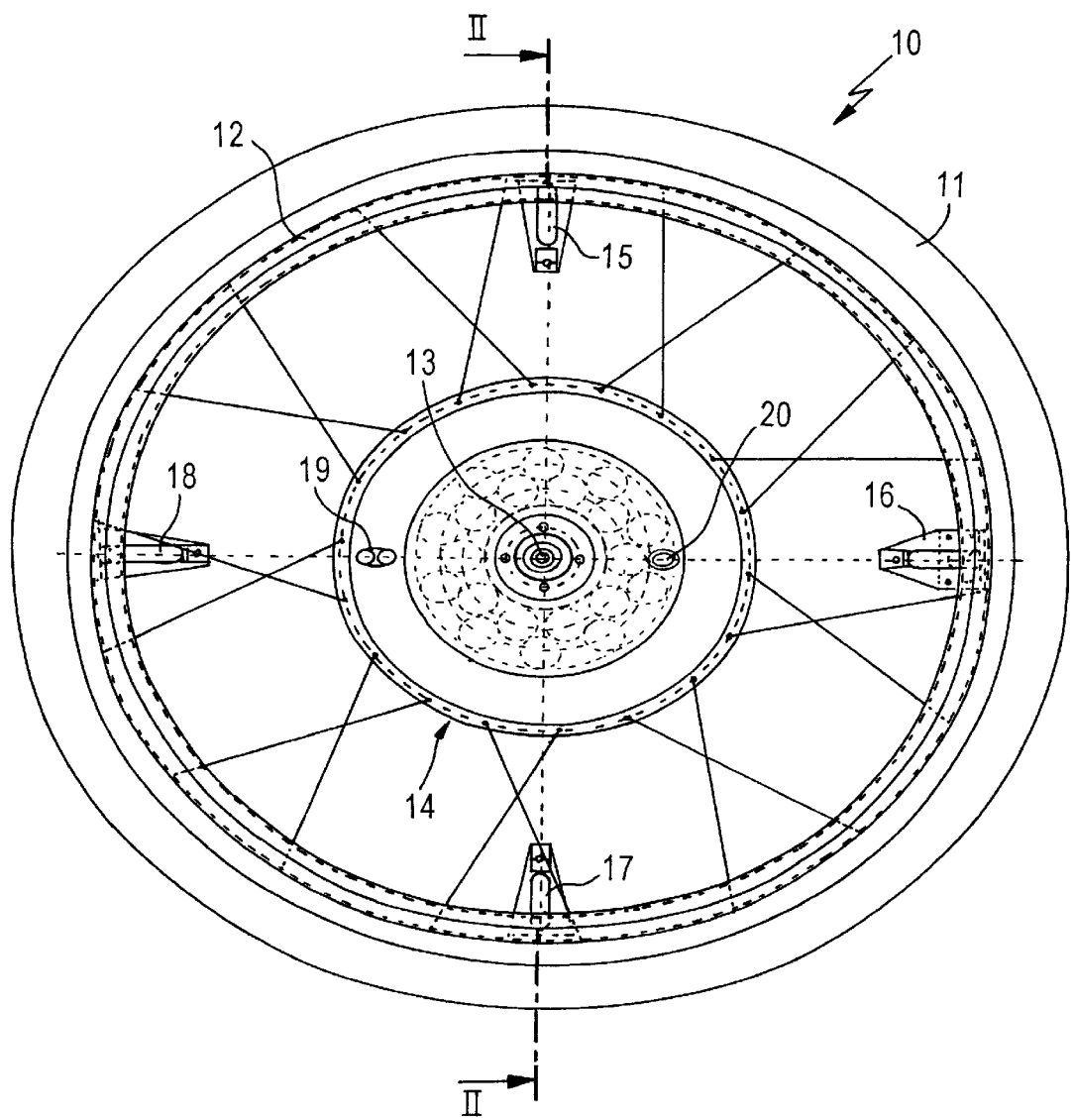

United States Patent
Alber

[19]

[11] Patent Number: 6,155,367
[45] Date of Patent: Dec. 5, 2000

[54] DRIVE ASSISTANCE DEVICE FOR A HAND-DRIVEN WHEEL CHAIR

[75] Inventor: Ulrich Alber, Albstadt, Germany

[73] Assignee: Ulrich Alber GmbH & Co. KG, Albstadt, Germany

[21] Appl. No.: 09/265,995

[22] Filed: Mar. 11, 1999

[30]   Foreign Application Priority Data

Mar. 21, 1998 [DE] Germany .......................... 198 12 563
Dec. 15, 1998 [DE] Germany .......................... 198 57 786

[51] Int. Cl.$^7$ ...................................... B60K 1/00
[52] U.S. Cl. ...................... 180/65.5; 180/65.8; 180/6.5; 180/907
[58] Field of Search ................... 180/65.1, 65.5, 180/907, 19.1, 65.3, 19.3, 6.5; 297/DIG. 4; 280/250.1, 304.1

[56]   References Cited

U.S. PATENT DOCUMENTS

| | | |
|---|---|---|
| D. 401,540 | 11/1998 | Yamamoto . |
| 4,050,533 | 9/1977 | Seamone . |
| 4,125,169 | 11/1978 | Harris et al. . |
| 5,234,066 | 8/1993 | Ahsing et al. . |
| 5,425,069 | 6/1995 | Pellegrino et al. . |
| 5,732,786 | 3/1998 | Fujigaki . |
| 5,771,988 | 6/1998 | Kikutani et al. . |

FOREIGN PATENT DOCUMENTS

| | | |
|---|---|---|
| 0 662 012 | 7/1995 | European Pat. Off. . |
| 0 687 454 | 12/1995 | European Pat. Off. . |
| 0 776 647 | 6/1997 | European Pat. Off. . |
| 0 790 049 | 8/1997 | European Pat. Off. . |
| 0 832 632 | 4/1998 | European Pat. Off. . |
| 0 861 648 | 9/1998 | European Pat. Off. . |
| 0 862 906 | 9/1998 | European Pat. Off. . |
| 4127257 | 2/1993 | Germany . |
| 195 27 680 | 3/1997 | Germany . |
| 197 08 058 | 9/1998 | Germany . |

OTHER PUBLICATIONS (1) G.B. Cremers "Hybrid–powered wheel chair: a combination of arm force and electrical power for propelling a wheel chair" Journal of Medical Engineering and Technology, vol. 13, No. 1/2 (Jan./Apr. 1989), pp. 142–148.

*Primary Examiner*—Richard M. Camby
*Attorney, Agent, or Firm*—Lowe Hauptman Gopstein Gilman & Berner

[57]   ABSTRACT

A drive assistance device for a hand-driven wheel chair has two running wheels, said running wheels being adapted to be detachably mounted to a wheel chair frame and being provided with hand rims for applying manual force. Each of said running wheels comprises a drive unit having an electric motor, a power supply and an electronic control unit associated thereto. Said complete drive unit including said electric motor, said power supply and said electronic control unit associated thereto is located in the region of the wheel hub. Preferably, said drive unit including said electric motor, said power supply and said electronic control unit associated thereto is adapted to rotate together with said running wheel.

12 Claims, 3 Drawing Sheets

DRIVE ASSISTANCE DEVICE FOR A HAND-DRIVEN WHEEL CHAIR

The invention relates to a drive assistance device for a hand-driven wheel chair having two running wheels, such running wheels being adapted to be detachably mounted to the wheel chair frame and being provided with hand rims for applying manual force, each of said running wheels comprising a drive unit having an electric motor as well as a power supply and an electronic control unit associated thereto.

Such drive assistance devices for wheel chairs having hand rims for applying manual power are known in the prior art. They serve to facilitate the use of the wheel chair over long distances or on uneven tracks. All these known devices require, however, structural amendments of the wheel chair frame so that it is troublesome to retrofit already existing wheel chairs with such known drive assistance devices. Moreover, transportation of wheel chairs having such known drive assistance devices, for example in the trunk of an automobile, is rather difficult since detachment of the running wheels from the frame requires a substantial effort. Furthermore, care has to be taken during transport of the wheel chair that elements of the drive assistance device protruding from the wheels are not damaged.

A still further problem associated with such known drive assistance devices is that sliding or non-contact transmission of signals between a rotating wheel and a stationary drive assistance device is required.

It is the object of the invention, to provide an improved drive assistance device for a hand-driven wheel chair which avoids the above-mentioned problems.

The object to this solution is given in the claims.

According to the present invention, a drive assistance device as described above is characterized in that the drive unit of a wheel is a portion of the wheel and is preferably completely provided in the region of the wheel hub. Accordingly, the drive assistance device according to the present invention does not require any structural amendments of the wheel chair frame. All elements of the drive assistance device are located at the center of the running wheels, i.e in the region of the wheel hub.

According to a preferred embodiment of the invention, the drive unit including the winding of the electric motor, the power supply and the electronic control unit are adapted to rotate together with the running wheel. This provides the advantage that sensors which also rotate together with the wheel can be connected to the drive unit via fixed cables or wire connections which also rotate together with the running wheel while, in case the drive unit does not rotate together with the running wheel, inductive or optoelectronic coupling elements or coupling elements with sliding contact members between the sensors and the drive units have to be used. Such elements, however, require additional mounting space, are likely to be contaminated and may lead to misfunction of the drive of the drive unit.

In a preferred embodiment of the invention, the drive unit of a wheel includes a first adjusting means which is adapted to adjust the degree of drive assistance so that the therapeutic value of the hand-driven wheel chair for developing the arm and shoulder muscels is maintained while excessive strain to the arm muscels and arm joints are avoided.

Moreover, the drive unit of a wheel can also include a second adjusting means which is adapted to adjust the characteristics of an after-running of the drive assistance device, i.e. the period of time for which power is left applied to the wheel after the supply of human power is stopped, the amount of torque which is left applied during this period and the slope according to which the torque is reduced during this period.

Furthermore, the drive unit can have a torque support which supports the running wheel in relation to the wheel chair frame.

The drive unit includes an electric motor. Depending on the kind of electric motor, the drive unit optionally can be provided with a gear transmission.

The hand rim is mounted concentrically to the running wheel. However, it is advantageous if the hand rim is supported at the running wheel outside the wheel hub so that the structural elements connecting the hand rim to the running wheel do not extend to the center portion of wheel, i.e. the region of the wheel hub. Preferably, a plurality of mounting means are provided which are equiangularly arranged and which are mounted to the running wheel at a portion radially outward of the region of the wheel hub. Due to this arrangement, the region of the wheel hub is left completely unoccupied so that it can encompass the drive unit of the device. Moreover, it is thereby possible to integrate the drive unit in the hub portion of the running wheel without any protrusion.

According to another preferred embodiment of the invention, the mounting means can be supported in an elastic and resilient manner so that it can be achieved that the rotational movement of the hand rim effected by the manual force applied to the hand rim is the same as if the hand rim would be supported at the center of the running wheel.

A load sensor or force sensor can be provided, such sensor being adapted to measure the force applied to the hand rim and to generate a corresponding measuring signal and to transduce it to the electronic control unit of the drive unit. In response to this measuring signal and depending on the setting of the degree of assistance, a corresponding drive signal is generated and provided to the electric motor. Preferably, this load sensor or force sensor is mounted in the region of at least one mounting means.

Furthermore, it is possible to reduce the speed by braking the wheel chair by means of the drive assistance device when the wheel chair is running downhill. If a brake force is applied to the hand rims, the electric motors reverse their running direction.

Further advantages are obtained if the running wheels are adapted to be mounted to the wheel chair frame by means of a quick change plug-in axle. Thereby, a wheel chair cannot only be retrofitted with the drive assistance device in a simple way but can also be transported in the trunk of a vehicle quickly and without any problems. To achieve this, the running wheels are detached from the wheel chair frame via the quick exchange plug-in axle and the wheel chair frame is folded. The wheel chair can be assembled after the transport in an equally easy way. Thereby, it is advantageous if the running wheels are formed identically. In such case, the user has not to take care which wheel has to be mounted on the left side and which wheel has to be mounted on the right side of the wheel chair frame.

Preferably, the running wheels are provided with safety switches which switch off the drive units when the running wheels are detached from the wheel chair frame. Any unintended activation of the drive units according to incorrectly mounted or completely dismounted running wheels, for instance during the transport of the wheel chair, is thereby ruled out.

It is obvious for a person skilled in the art that the special features of the various embodiments described above and below can be realized in any combination as appropriate.

Figure 2:
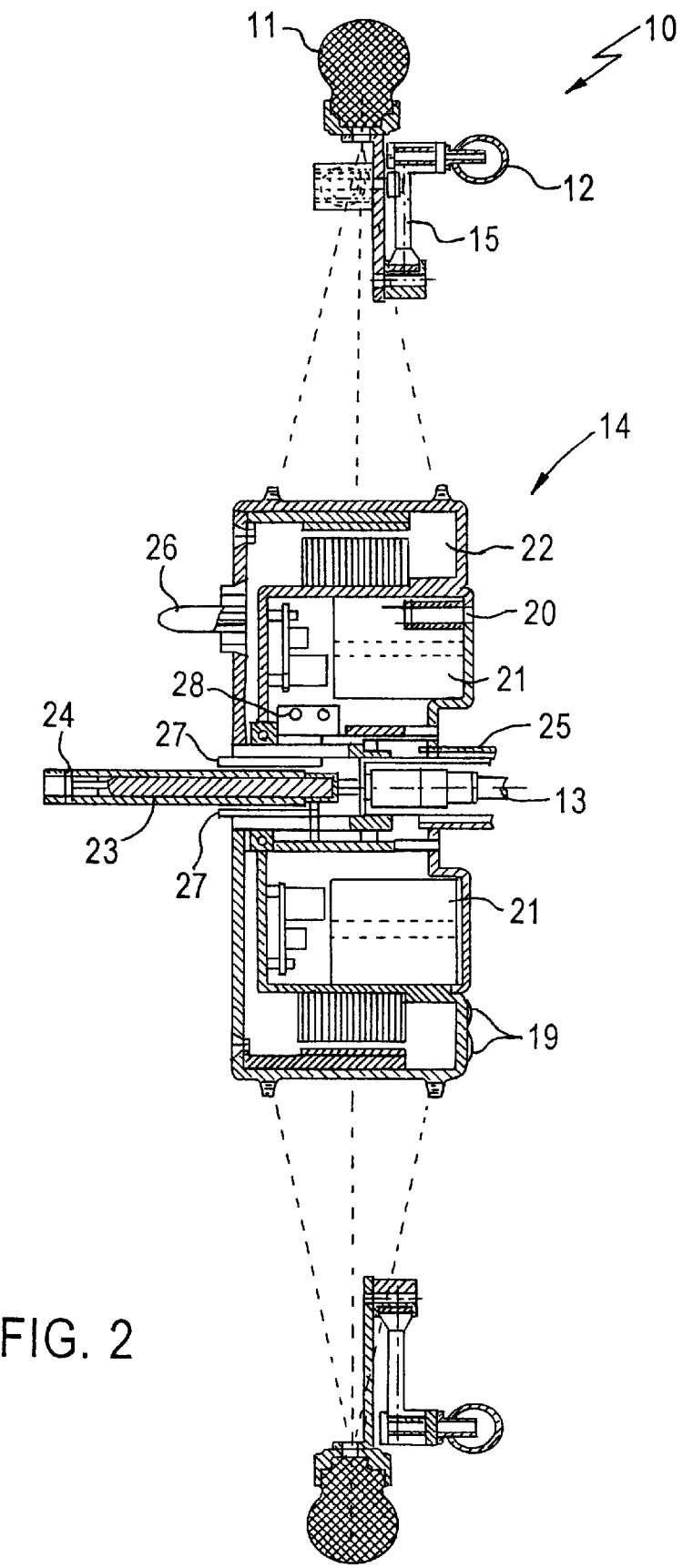

In the following, the invention is further explained by way of example in connection with a preferred embodiment of a drive assistance device according to the present invention, making reference to the drawings, in which:

FIG. 1 is a plan view of a running wheel of a drive assistance device;

FIG. 2 a sectional view of the running wheel along line II—II in FIG. 1; and

Figure 3:
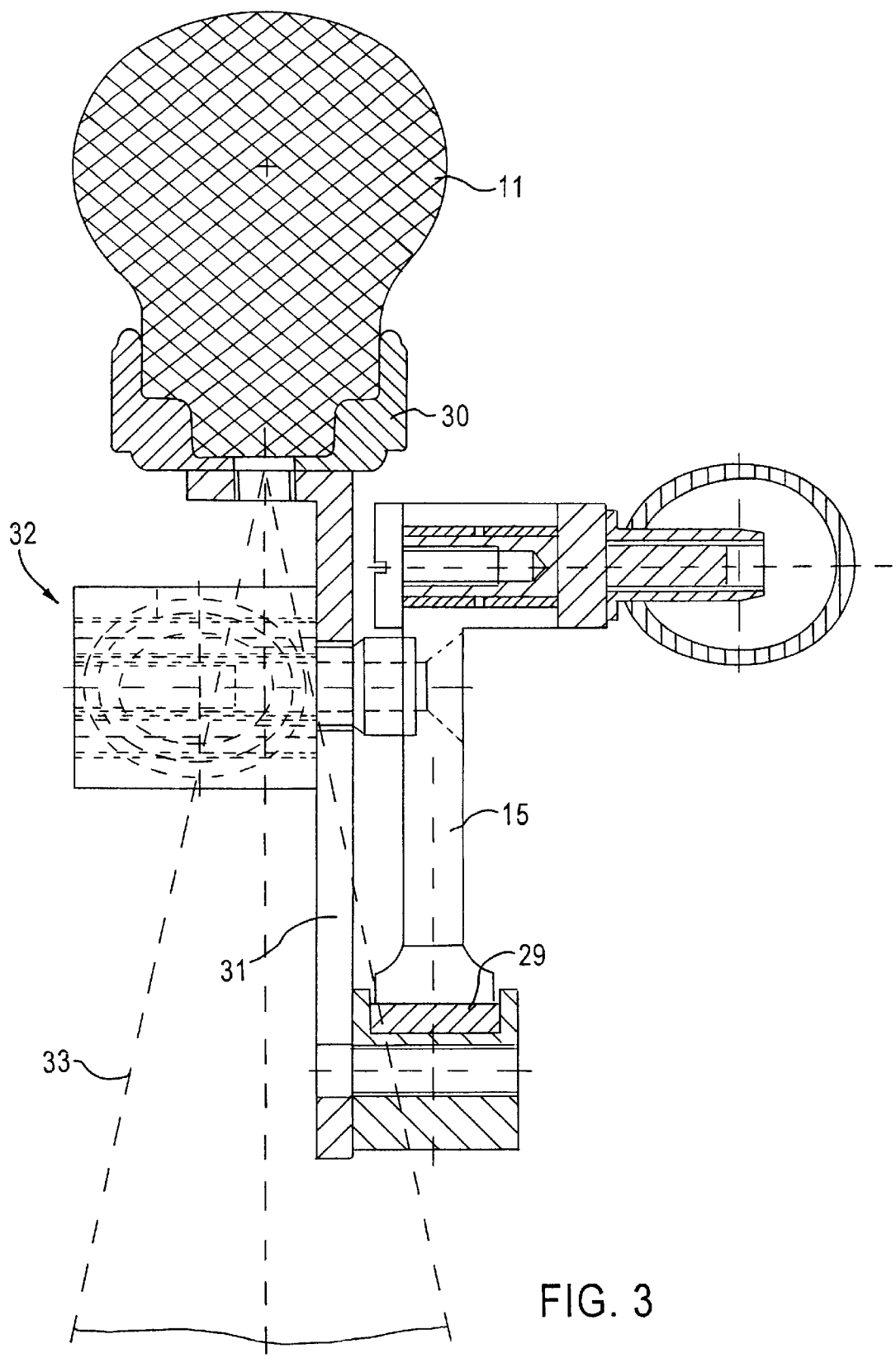

FIG. 3 is an enlarged detail view of the hand rim support of the running wheel shown in FIG. 2.

FIG. 1 shows a running wheel 10 having a tire 11 and a hand rim 12 for manual drive. A drive unit 14 is mounted in the region of the wheel hub. The hand rim 12 is not supported at the running wheel 10 by being mounted to the wheel hub but by four mounting means 15, 16, 17, 18 which are distributed over its perimeter. A main switch 13 for switching the drive unit 14 on and off is provided in the center of the drive unit 14. Furthermore, the drive unit 14 comprises a foil sensor 19 for adjusting the after-running characteristics. A charging socket 20 for charging an accumulator 21 (FIG. 2) as a power supply means for the drive unit 14 is provided on the opposite side of the drive unit 14.

The internal structure of the drive unit 14 is shown in FIG. 2. An electric motor 22 forms the outer radial part of the drive unit 14. Inside thereof accumulators 21 are provided. The complete running wheel 10 is adapted to be attached to a wheel chair frame (not shown) by means of a quick change plug-in axle 23. Lock balls 24 which are adapted to engage with a sleeve at the wheel chair frame in order to secure the running wheel 10 to the frame are provided at one end of the plug-in axle 23. A turning handle 25 by means of which the lock balls 24 can be pushed inside the plug-in axle 23 in order to unlock the plug-in axle 23 is provided at the outer side of the running wheel 10. On the inner side of the running wheel 10 there is provided a torque support 26. Operating pins 27 for a safety switch 28 are provided in the region of the plug-in axle 23, such safety switch 28 ensuring that the drive unit 14 only can be switched on if the running wheel 10 is properly mounted The support of the hand rim 12 at the running wheel 10 is shown in FIG. 3. The hand rim 12 is attached to a plurality of mounting means. One mounting means 15 is shown in FIG. 3. The mounting means 15 in turn is elastically mounted to a support plate 31 via a rubber member 29 which support plate 31 is connected to a wheel rim 30 of the running wheel 10. The support of the hand rim 12 in such elastic and resilient manner provides a rotational movement of the hand rim 12 upon applying a manual force to the hand rim 12 in the same way as if the hand rim 12 would be supported at the wheel hub concentrically to the tire 12. A load sensor or force sensor 12 is also provided at the mounting means 15, such load sensor or force sensor 32 being adapted to measure the force applied to the hand rim 12 and to generate and transfer a corresponding measuring signal along one of the mounting means 33 of the running wheel 10. This measuring signal serves to control the electric motor 22 which is also rotating. Depending on the force applied to the hand rim 12 and the degree of assistance adjusted via the sensor 19, the power electronic control unit of the electric motor 22 is driven correspondingly. The direction of the force applied to the hand rim also can be detected by the load sensor or force sensor 32. In correspondence therewith, the electric motor 22 assists either the moving of the wheel 10 in a forward direction or it brakes this movement.

What is claimed is:

1. A drive assistance device for a hand-driven wheel chair having two running wheels, said running wheels being adapted to be detachably mounted to a wheel chair frame and being provided with hand rims for applying manual force, each of said running wheels comprising a drive unit having an electric motor, a power supply and an electronic control unit associated thereto, wherein said complete drive unit including said electric motor, said power supply and said electronic control unit associated thereto is located in the region of the wheel hub, wherein said drive unit including said electric motor, said power supply and said electronic control unit associated thereto is adapted to rotate together with said running wheel.

2. The drive assistance device according to claim 1, wherein said running wheel is provided with a safety switch which is adapted to switch off said drive unit when said running wheel is detached from said wheel chair frame.

3. The drive assistance device according to claim 1, wherein said drive unit includes a first adjusting means for adjusting the degree of drive assistance.

4. The drive assistance device according to claim 1, wherein said drive unit includes a second adjusting means for adjusting the characteristics of an after-running of said drive assistance device.

5. The drive assistance device according to claim 1, wherein said drive unit includes a torque support.

6. The drive assistance device according to claim 1, wherein said electric motor has a direct drive without a gear transmission.

7. The drive assistance device according to claim 1, wherein said drive unit includes a gear transmission.

8. The drive assistance device according to claim 1, wherein said hand rim is supported by a plurality of mounts, said mounts being mounted at said running wheel at a portion radially outward of the region of the wheel hub so that the region of the wheel hub is left unoccupied and is adapted to encompass the drive nut.

9. The drive assistance device according to claim 7, wherein said mounts are resiliently supported.

10. The drive assistance device according to claim 8, wherein a load sensor is provided in the region of at least one of said mounts, said load sensor being adapted to measure the force applied to said hand rim, to generate a corresponding measuring signal and to transduce said measuring signal to said electronic control unit of said drive unit.

11. The drive assistance device according to claim 1, wherein a quick exchange plug-in axle is provided to attach said running wheel to said wheel chair frame.

12. The drive assistance device according to claim 1, wherein said running wheels are formed identically.

* * * * *